Dec. 14, 1965

C. C. LASH 3,223,967

ELIMINATING SEISMIC INTERFERENCE WAVES
BY A CANCELLATION PROCEDURE

Filed Nov. 23, 1962

INVENTOR:
CHARLES C. LASH

BY *Newell Pottorf*

ATTORNEY

Dec. 14, 1965     C. C. LASH     3,223,967
ELIMINATING SEISMIC INTERFERENCE WAVES
BY A CANCELLATION PROCEDURE
Filed Nov. 23, 1962     3 Sheets-Sheet 2

INVENTOR:
CHARLES C. LASH
BY Newell Pottof
ATTORNEY

INVENTOR:
CHARLES C. LASH
BY Newell Potter
ATTORNEY

United States Patent Office 3,223,967
Patented Dec. 14, 1965

3,223,967
ELIMINATING SEISMIC INTERFERENCE WAVES
BY A CANCELLATION PROCEDURE
Charles C. Lash, Tulsa, Okla., assignor to Pan American Petroleum Corporation, Tulsa, Okla., a corporation of Delaware
Filed Nov. 23, 1962, Ser. No. 239,840
7 Claims. (Cl. 340—15.5)

This invention relates to seismic geophysical surveying and is directed particularly to improving the signal-to-noise ratio by substantially eliminating seismic interference present in the recorded waves.

In seismic geophysical surveying, wherein artificial seismic waves are generated at one location and received at other locations spaced therefrom after travel through the earth, a major problem is detecting the desired signals in the presence of noise. In a broad sense, noise is anything which prevents observing a desired seismic signal arriving at about the same time. Thus, it may include both random noise, which is completely unpredictable as to its form and manner of occurrence, and non-random noise, which in one or more senses is predictable or systematic. Thus defined, even one desired signal may be a non-random noise as regards detecting another signal if they are so close together in time as to overlap.

It is particularly to reducing or substantially eliminating recorded non-random noise, which may perhaps more properly be termed interference, that the present invention is directed. That is to say, a primary object of the present invention is to substantially reduce or eliminate seismic interference from the records of seismic waves or from the data displays made therefrom. Another object is to provide a novel method and apparatus for so determining and utilizing the characteristics of seismic interference that it may be eliminated from the seismic recordings in which it occurs. A still further object is to provide a novel method and apparatus, for successive application to seismic recordings, to analyze said recordings into their component waves. A still further object is to provide a method of recording and analyzing seismic data which affords good discrimination against seismic interference waves with a minimum amount of overlap or mixing of the signals received at different locations to emphasize vertical arrivals. Other and further objects, uses, and advantages of the invention will become apparent as the description proceeds.

Briefly stated, the foregoing and other objects are accomplished by detecting the seismic waves arriving at a larger number of points spaced along a line, over an area, or throughout a volume, so combining the waves received at said larger number of points as to emphasize the form and time of occurrence of an interference wave or waves, and then utilizing this determination in a subtraction step or circuit to cancel the interference wave form appearing at one or a smaller number of points included within the larger number. By successive application of the subtracting step at each of the points, the interference is substantially reduced or eliminated therefrom to permit observing any desired signals of smaller amplitude which may have been obscured by the interference.

The foregoing method can be distinguished from the conventional use of filters by noting that an interference wave can be eliminated regardless of its frequency content, provided that its form and time of occurrence can be ascertained with reasonable accuracy, while filters are only effective if the frequency contents of the desired wave and of the interference wave are substantially different. This does not mean that filters cannot be used with this invention, however. On the contrary, to the extent that the interference and the desired signal differ in frequency spectrum, conventional filtering may also be applied to the data to increase the final signal-to-noise ratio still further beyond what either it or the invention can do alone.

Elimination of an interference wave according to the present invention, primarily requires that its manner or time pattern of occurrence over an extensive length, area, or volume of observation be somewhat different from the time or pattern of occurrence of the desired seismic waves. In general, this means only that the interference wave must be one traveling in a somewhat different direction from the desired seismic waves. Obviously, if an interference wave has the same form and travels in the same direction as the desired seismic waves, there is no basis for discriminating between them either by means of a conventional filter or by the present invention.

This will be better understood by reference to the accompanying drawings forming a part of this application and showing typical embodiments of the invention and the results which it produces. In the drawings, FIGURE 1 is a diagrammatic plan view of a field recording arrangement according to the invention;

Figure 1:
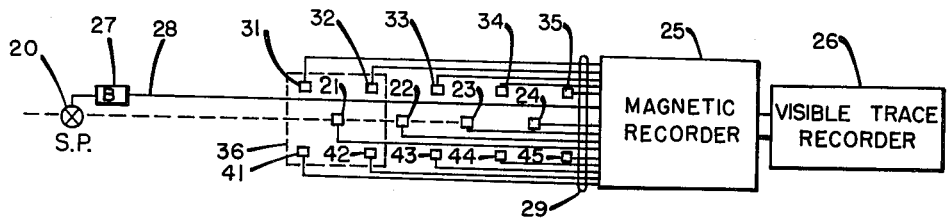

Referring now to the drawings in detail, and particularly to FIGURE 1, this plan view shows a shot hole 20 and a plurality of seismometers 21, 22, 23, and 24 spaced from hole 20 and in alignment with it. On either side and parallel to the line 21–24 are additional seismometers 31–35 and 41–45. At shot hole 20 is a blaster 27 for detonating an explosive charge in the hole, while a time-break lead 28 extends from the blaster to a magnetic recorder 25, along with a cable 29 separately carrying the outputs of all of the various seismometers to the recorder. The recorder 25 is adapted to make separate phonographically reproducible trace recordings of the output of each seismometer or seismometer group. A visible-trace recorder 26 such as an oscillographic galvanometer camera is preferably also provided to monitor and display the data.

In operation, records are made by the apparatus of FIGURE 1 in a completely conventional manner, for example, by detonating an explosive charge in shot hole 20 and recording the resulting seismic waves at each of the seismometers or seismometer groups as a separate magnetic trace by the recorder 25.

Figure 2:
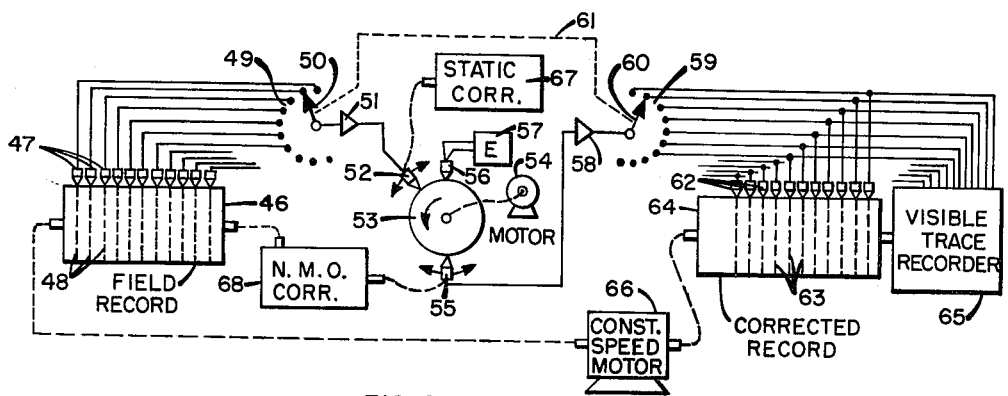
FIGURE 2 is a diagrammatic illustration of a playback apparatus for correcting field records for use in this invention.

In FIGURE 2 is shown one embodiment of an apparatus for making the various conventional corrections to the field record produced by recorder 25. Thus, the field magnetic record 46, suitably mounted on a rotatable drum, is scanned by a plurality of magnetic reproducing heads 47 aligned across the width of the record. Each head 47 electrically reproduces a corresponding one of the field traces 48 and transmits its output to one point of a multipoint selector switch 49 having a rotatable arm 50. The arm 50 is connected through a reproducing amplifier 51 to a recording head 52 which is adjacent a transfer magnetic disc or drum 53 rotated at constant speed by a motor 54. Positioned at a variable spacing around the periphery of drum 53 is a reproducing head 55. Also, in a fixed position adjacent the drum is an erasing head 56 energized by a suitable alternating-current voltage from a source 57. The reproducing head 55 feeds an amplifier 58 coupled to the arm 60 of a second selector switch 59, the various points of switch 59 being respectively connected to each of a plurality of aligned recording heads 62, recording on a corrected-record medium 64 a plurality of parallel corrected traces 63. A connecting linkage 61 between the switch arms 50 and 60 coordinates the playback and re-recording of the data from field record 46 to the corrected magnetic record 64 one trace at a time, in sequence. Connected in parallel with the heads 62 is a visible-trace recorder 65, which may be similar in character to the field recorder 26, to produce a record having oscillographic traces or the like capable of visual inspection and interpretation. A constant-speed motor 66 drives the drum of field record 46 as well as the re-record drum 64 and the visible trace recorder 65, maintaining all of these elements in exact synchronism.

As is suggested by the adjacent arrows, the recording head 52 is movable to various fixed positions around drum 53 by a static correction mechanism 67 adapted to apply any fixed relative corrections to the different trace reproductions required to compensate for variations in elevation, weathering travel time, datum plane depth, and the like. Likewise, the reproducing head 55 is movable about the periphery of drum 53 by a normal moveout correction mechanism 68 in a manner well known in the art, to correct for the additional travel time of a reflected seismic wave due to a particular seismometer being located at some distance from the shot point 20 rather than directly above it.

As all of the apparatus thus far described is conventional in the art, no extended explanation is believed necessary, other than to point out that upon properly programming the static-correction apparatus 67 and the normal moveout-correction apparatus 68, while rotating the field record drum 46 and the corrected record drum 64 and stepping the switches 49 and 59 once with each revolution, a completely corrected record 64 is obtained, along with its visible-trace playback from the recorder 65, for further utilization in accordance with this invention.

Figure 3:
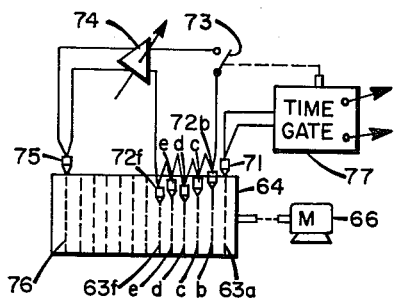
FIGURE 3 is a diagrammatic illustration of a determination of an interference wave form.
Figure 7:
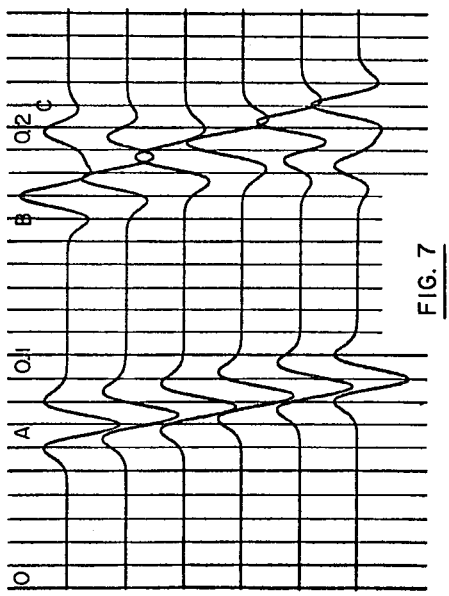

In accordance with FIGURE 3, the operations of this invention are performed upon the corrected record 64 in a manner which is determined in a preliminary way from the record of visible-trace recorder 65. The trace 63a of record 64 may be a timing trace which produces impulses at evenly spaced intervals of record time and is scanned by the reproducing head 71. The adjacent five traces 63b–63f, respectively scanned by the reproducing heads 72b–72f, may be considered to correspond to the five seismometer positions within the dotted-line enclosure 36 of FIGURE 1. That is, these traces correspond to the outputs of seismometers 31, 32, 21, 41, and 42, respectively. The five reproducing heads 72b–72f are connected in series and through a switch 73 to the input of an amplifier 74 which drives a recording head 75, producing on an unused space of the record 64 a trace 76. The timing trace 63a producing impulses in the head 71 actuates a time gate circuit 77 which, during a certain part of the playback cycle of the record 64, closes the switch 73 to record during this time interval on the trace 76 a signal representing the sum of the individual traces 63b–63f. FIGURE 7 of U.S. Patent 3,142,750, issued to Daniel Silverman et al., shows in detail a circuit for performing the operations of time gate 77, by providing two impulses at any two pre-set trace times, one for closing switch 73 and one for opening it.

In operation, inspection of the visible record from recorder 65 is made to ascertain the time of occurrence and moveout pattern across the area 36 of an event which is considered to be an interference wave. The controls of gate circuit 77 are set to close the switch 73 a short time before the beginning of this event and to reopen this switch a short time after the event has passed. Each of the reproducing heads 72b–72f, movable along the length of the traces 63b–63f, is shifted so as to compensate for the different times of appearance of the interference wave on the different traces. That is, the reproducing heads 72b–72f are so positioned, by reference to the visible record of recorder 65, as to bring into exact time coincidence all of the reproductions of the interference wave by the different heads 72b–72f. The gain of the amplifier 74 is preferably adjusted so that the summation trace 76 contains the interference wave with substantially the same amplitude as it occurs on each of the individual traces 63b–63f.

Figure 4:
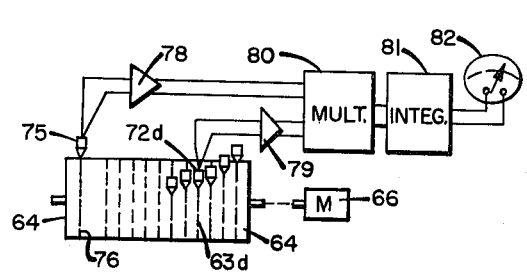
FIGURE 4 is a diagrammatic illustration of a preferred way of establishing the interference-wave time pattern.

Both in the foregoing summation and especially in the subtraction steps (described below) of this procedure, it is important to have the time coincidence of the interference wave in the traces being combined as exact as possible. The sensitivity of the subtraction step to timing errors can be appreciated from the fact that an error of only one-half the interference-wave period causes the interference wave to be doubled in amplitude rather than canceled. While frequently it is possible to time the interference wave on the different traces with sufficient accuracy from the visible record of recorder 65, it may sometimes be preferred to check the accuracy of this timing in the manner illustrated in FIGURE 4. This shows the timing check of the trace 63d, which may correspond to the seismometer 21, against the summation of the interference wave in the trace 76. The recording head 75 is connected as a reproducer through an amplifier 78 to multiplying circuit 80, while the recording head 72d is connected as a reproducer through the amplifier 79 also to the multiplier 80. The output of multiplier 80 is integrated over a period of time at least co-extensive with the duration of the interference wave by an integrator 81, the output of which is applied to an indicator 82.

In operation, the head 72d is manually shifted along the length of the trace 63d, while observing the indications of meter 82, until a clear maximum is obtained. As will be understood, this corresponds to a process of cross-correlation of the interference form in the trace 63d with its optimized wave form in the summation trace 76. In a similar way, each of the other reproducing heads 72b, 72c, 72e, and 72f is individually correlated with the summation trace 76, and the exact timing of the interference wave in each individual trace is thus determined with a high degree of accuracy. If it is found as a result of this testing that any of the heads 72b–72f was inaccurately positioned in making the record of FIGURE 3, it is accurately repositioned as determined in FIGURE 4, and a new summation trace 76 is made in accordance with FIGURE 3.

Figure 5:
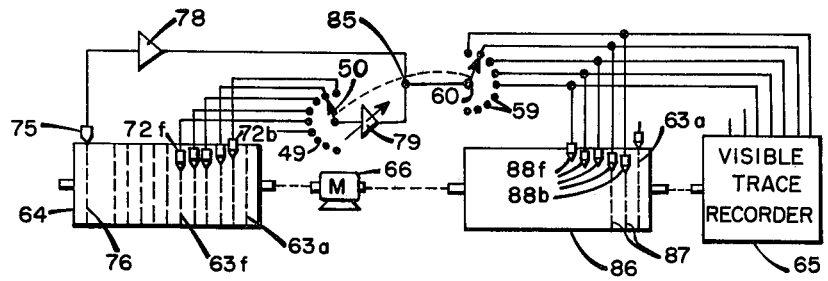
FIGURE 5 is a diagrammatic illustration of one form of apparatus for interference wave elimination.

The individual trace times of the interference wave having thus been accurately established, the record is further played back as shown in FIGURE 5. The sequence switch mechanisms 49 and 59 provide for playback, one trace at a time, of the corrected record 64, the amplifier 79 being adjustable to equalize the amplitude of each individual-trace interference wave with its summation on the trace 76. In cases where the equality of interference-wave amplitudes in the traces being subtractively combined is difficult to establish, as when overlapping with the signal is a maximum, a certain amount of trial and error adjustment of the gain of amplifier 79 may be resorted to to obtain the best overall cancellation results. It will generally be preferred that any residual error be in the direction of under or incomplete cancellation of the interference wave rather than re-introducing it in opposite phase by over-cancellation. The outputs of the amplifiers 78 and 79 are fed in opposition to the circuit point 85 to which is connected the switch arm 60. By connection to the points 59 of the switch, each of a plurality of recording heads 88b–88f in sequence records difference or remainder traces 87 on a record 86.

At the same time, the visible-trace recorder 65 records visible reproductions of the difference traces 87.

As can be seen from inspection of FIGURE 5, the positioning of the recording heads 88b–88f is preferably inversely related to the positions of heads 72b–72f. That is, the position of each of the individual heads 88b–88f exactly compensates for the non-alignment of the heads 72b–72f, so that the relative timing of all events on the traces 87 is the same as on the corrected traces 63, except for the interference wave having been substantially removed. The record 86 is thus ready either for display or removal of additional interference waves.

Figure 6:
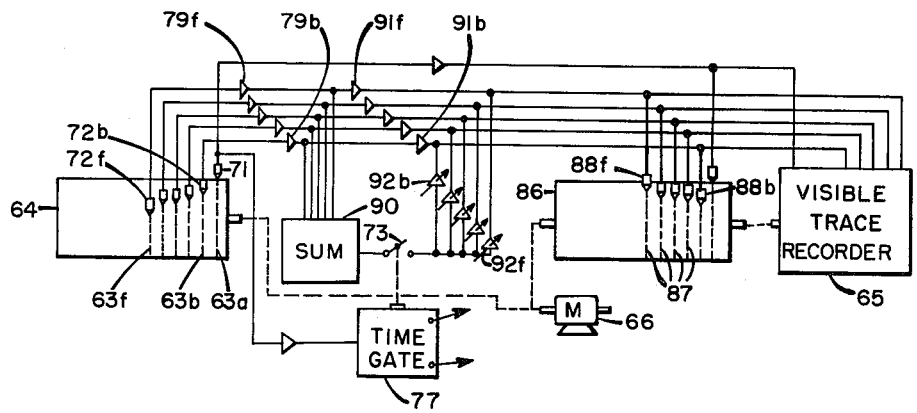
FIGURE 6 is a diagrammatic illustration of an alternative form of apparatus for interference wave elimination.

An alternative arrangement of apparatus is shown in FIGURE 6 for performing simultaneously for a plurality of traces the operations of the present invention shown separately in FIGURES 3 and 5. The reproducing portion of the apparatus of FIGURE 6, beginning with the corrected record 64, generally resembles that of FIGURES 3 and 5 in that the traces 63b–63f are scanned by the respective playback heads 72b–72f arranged in a time pattern to bring the interference wave into time coincidence in all trace reproductions. Instead of connecting the heads themselves in series, however, each feeds a corresponding playback amplifier 79b–79f, and the outputs of these playback amplifiers are connected in parallel to a summation circuit 90, which instantaneously forms the sum corresponding to that previously recorded on the trace 76. The timing trace 63a, through the playback head 71, operates the time gate circuit 77 to close the circuit switch 73 at the proper time of the interference wave, which will have been previously ascertained from the visible-trace record. The output of summation circuit 90 is applied through a plurality of separate amplifying channels 92b–92f, each being adjusted to provide the proper amplitude of the sum for cancellation of the interference wave in each individual channel. A plurality of buffer amplifiers 91b–91f is interposed between the inputs to summation circuit 90 and the output points to prevent feedback. It is understood, of course, that the respective pairs of outputs of amplifiers 91b–91f and 92b–92f are in phase opposition, so that during the time switch 73 is closed, cancellation of the interference wave occurs on the output for each of traces 63b–63f. If necessary to maintain exact time coincidence between the interference wave in the summation and in the individual trace channels, amplifiers 91b–91f or 92b–92f may include delay elements. Accordingly a corrected record 86, with the interference substantially eliminated in the individual difference traces 87, is produced by the recording heads 88b–88f. The displacement pattern of the reproducing heads 72b–72f corresponds to the pattern in FIGURES 3 and 5, while that of recording heads 88b–88f corresponds to that of FIGURE 5, thus placing the various traces 87 in their original corrected-time relationship. As in FIGURE 5, the visible-trace recorder 65 records in oscillographic or similar form the traces corresponding to the record 86.

While the foregoing description has shown the cancellation of interference from all five traces representing the five seismometers within outline 36, this is not the only way the invention can be applied. The central seismometer 21 can be regarded as the signal-producing seismometer for interpretation or display purposes, while the surrounding seismometers 31, 32, 41, and 42 are primarily interference detectors. Their sum, with the proper relative time delays to superimpose the interference, and either including or excluding seismometer 21 from the summation as desired, is taken as the optimum form of the interference wave to be subtracted from the signal trace made by seismometer 21.

In the same way, seismometers 32, 33, 42, and 43 can be utilized as the interference-determining group for the signal seismometer 22; and so on, for signal seismometers 23 and 24. That is, each signal-seismometer output has its interference removed by cancellation with the sum of the seismometers surrounding it. This may be considered analogous to a process of interpolation in which a variable is evaluated for a given point from the values it assumes at a plurality of surrounding points. How many points to use and how to use them will usually be apparent from study of the variable at several points differently spaced from the given point.

Also, it is to be understood that the use of the five seismometers 21, 32, 32, 41, and 42 as a summation group is shown only as an example. All fourteen seismometers of FIGURE 1 could be combined to determine the optimum interference wave form to be subtracted from any or all of the individual traces to be interpreted or displayed. The assumes that the character of the interference wave is similar at all fourteen seismometers, which can ordinarily be ascertained by inspection of the visible-trace record from recorder 65. If the interference character varies markedly over the area covered by the seismometers, then it should be separately determined for each smaller area, such as area 36, and used for cancellation only within that area.

If the summation group is quite numerous and large in extent, it may often be advantageous before summation to weight the contributions of seismometers near the point where the interference is to be cancelled more heavily than those of seismometers farther away. Besides possibly improving the wave form of the interference wave for use in cancellation at the central point, this can reduce the uncancelled end effects of a signal of different moveout from the interference. That is, the signal moveout when the interference is aligned for summation can effect a degree of self-cancellation of the signal in the summation everywhere except at the ends of the summation group, where it can be reduced only by "tapering" or attenuating each seismometer or group output. This can be done very simply in FIGURE 6, for example, by including calibrated attenuators in playback amplifiers 79b–79f or otherwise making them adjustable in gain.

Further, the term "interference" may be considered to include desired signals that conflict with or obscure other signals. That is, by a series of subtraction steps, each preceded by the determination of an optimum wave form by summation, recognized desired signals can be successively removed from the corrected magnetic recordings, leaving a residue in which it may be possible to recognize weaker significant signals. Ultimately, of course, all recognizable signals will have been removed, and the residue will be noise. By preserving a record of each wave form subtracted, a complex seismogram may thus be analyzed into its component signals. That no information is lost in this process can be shown by preserving in phonographically reproducible form the summation traces which are subtracted and adding them to the final difference traces with the proper time relationship, where upon the original corrected traces 63 are obtained.

FIGURES 7–11 show an example of the use of the present invention in the form of seismic traces prepared by a synthetic record computer such as that shown in application S.N. 39,696, filed June 29, 1960, by Daniel Silverman and Charles F. Hadley now Patent No. 3,142,-750. The six traces shown in FIGURE 7 correspond to the corrected record 64 as it would be shown by the recorder 65 at the conclusion of static and normal moveout corrections performed as in FIGURE 2. The input to the system was a Ricker wavelet of 20 milliseconds breadth. The six traces of FIGURE 7 correspond to six seismometer positions along a linear spread, the moveout of the event A centered at 70 milliseconds in the upper trace corresponding to the reflection from a dipping subsurface bed. That is, static and normal moveout corrections are assumed to have been applied to the traces of FIGURE 7, so that in the absence of subsurface dip, event A would align perpendicularly across the record traces.

Event B centered at 170 milliseconds on the upper trace can be considered an example of a multiple reflection of the primary reflection A. That is, the event B is of opposite phase from event A, having a peak where the latter has a trough, and the apparent moveout across the traces of the record is twice that of the event A. An event C of lesser magnitude than A and B, corresponding to a reflection from a subsurface bed, is completely obscured by the event B on the two center traces and partially so on the remaining traces. It is the purpose of this invention to cancel the event B in such a manner that the event C can be plainly seen or displayed.

Figure 8:
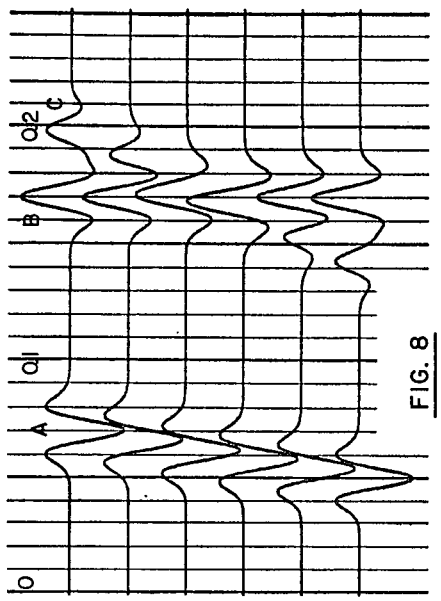
FIGURES 7 through 11 are reproductions of traces and seismic recordings made with a computing apparatus and showing the results of the various steps of interference wave removal according to the present invention.
Figure 9:

FIGURE 8 shows the six traces of FIGURE 7 shifted in time to align the event B across the record. With reference to the above-described figures, FIGURE 8 is the record which would be obtained from the recorder 65 with the playback heads 72b–72f shifted as in FIGURES 3, 4, and 5. FIGURE 9 corresponds to the summation trace 76 of FIGURE 3 or FIGURE 5 with its amplitude adjusted to match the amplitude of the event B on the separate traces. Since the event A does not appear on the trace of FIGURE 9, it can be assumed that the time gate 77 has been adjusted to close the switch 73 at a time of about 120 milliseconds and to open it again at a time of about 220 milliseconds.

Figure 10:
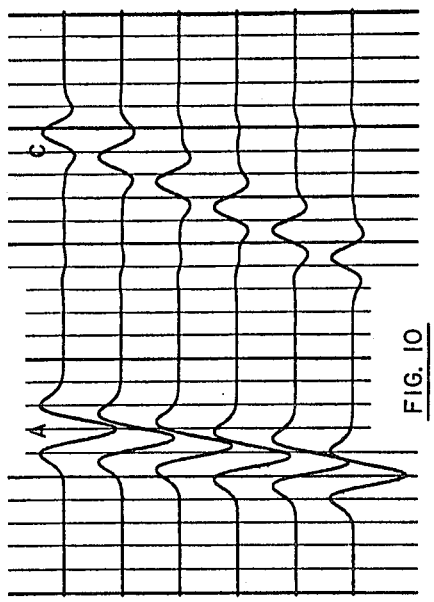
Figure 11:
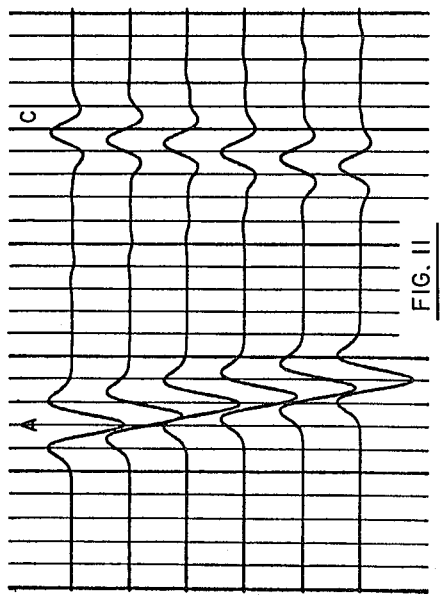

FIGURE 10 shows the direct result of the subtraction step of the process wherein the trace of FIGURE 9 is subtracted from each trace of FIGURE 8. The corrected traces are in the relative positions which would be given by the recorder 65 in FIGURES 5 and 6 if the playback heads 88b–88f were aligned directly across the record rather than staggered in a delay pattern complementary to the delay pattern of the heads 72b–72f. FIGURE 11 corresponds to FIGURE 10 except that it shows the form of the record actually made as corrected record 86 or shown as the visible record by the recorder 65 for FIGURES 5 and 6. That is, the event A is shown with its correct dip moveout as in FIGURE 7, while the event C is shown to have a slightly reversed direction of moveout, with the obscuring event B substantially completely removed. Thus, an accurate computation of the dip of event C can be made, or it can be shown on a cross-section display clearly without being obscured by the event B.

While in most cases a satisfactory record can be obtained in the manner just described, it is possible by a second, or multiple, application of the principles of this invention to make an even more complete separation of the events B and C. In determining the timing and wave form of the event B as shown by the trace of FIGURE 9, the event C could be considered a disturbing factor. Thus, when the event C has been approximately determined as in FIGURE 11, this first determination can be utilized to remove the event C from the traces of FIGURE 7. That is, the traces of FIGURE 11 are shifted, this time to align the event C, and a summation trace corresponding to FIGURE 9 is made of the aligned traces of FIGURE 11 to determine the optimum form of event C. This wave form is then subtracted from the original corrected traces of FIGURE 7 leaving the event B thereon in substantially undisturbed form. Subsequent alignment of these traces on event B as in FIGURE 8 then gives a new summation trace for FIGURE 9 in which the effects of the event C are no longer present. Accordingly, subtraction of this improved form of the event B from the traces of FIGURE 8 which include event C removes the event B therefrom without any disturbance due to the event C, so that the event C remains as in FIGURES 10 and 11, with a minimum of distortion due to imperfect removal of the event B.

Where the difference in moveout between events B and C is much smaller than that illustrated but still significant, this multiple application of the cancellation process alternately to optimize the subtracted wave forms operates as a method of successive approximation. That is, each application of the summation-and-cancellation steps improves the form of the residual event, and the approach to perfection in determining the forms of the overlapping waves and thus separating them theoretically requires only a sufficient number of approximations.

While the technique of this invention has been described with reference to the removal of an undesirable seismic event such as a multiple reflection B, it will be apparent that it is applicable to any wave forms which it may be desirable to remove in order to study what remains. That is, the primary reflection A could be similarly removed if it were suspected that it was obscuring some desired weaker event. In similar fashion, all of the strong events present on a record can be systematically removed by the present invention, and what remains can then be analyzed for the presence of weak but significant reflection events. The only criterion for retaining the events for study following removal of the interfering events is that the interfering and the remaining events must have somewhat different moveouts across the record traces. That is, the discrimination of this method of analysis is based on the difference of moveout of two or more events and is roughly in proportion thereto.

While the invention has been described with reference to the foregoing specific embodiments and examples, it will be apparent to those skilled in the art that other and further modifications are possible within the scope of the appended claims.

I claim:

1. The method of substantially eliminating a seismic interference wave from one of a plurality of phonographically reproducible seismic data traces representing the seismic waves reflected from a plurality of horizontally spaced subsurface reflection points and received at a corresponding plurality of reception points spaced from each other and from a point where said seismic waves are initiated, which method comprises the steps of reproducing a plurality of said traces representing adjoining ones of said reception points and including said one point, delaying the reproduction of some of said reproduced traces relative to others so as to bring said interference wave into substantial time coincidence on all of said reproduced traces, adding said reproduced traces together into a summation trace wherein said interference wave is maximized in amplitude and optimized in wave form, adjusting the relative amplitude of said summation trace and said one trace to bring the amplitude of said interference wave to substantially the same level therein, subtractively combining said summation trace and said one trace with said interference wave in time coincidence therein, whereby said interference wave is substantially canceled in said one trace, and displaying said one trace for interpretation of data which may have been obscured by said interference wave.

2. The method of substantially eliminating an interference wave from each of a plurality of phonographically reproducible seismic data traces each representing the seismic waves reflected from a plurality of horizontally spaced subsurface reflection points and received at one of a corresponding plurality of reception points spaced from each other and from a point of initiation of said waves, said method comprising the steps of simultaneously reproducing said data traces, time-delaying some of said traces relative to others so as to bring said interference wave into substantial time coincidence on all of said traces, additively combining said reproduced time-delayed traces into a summation trace wherein said interference wave is maximized in amplitude and optimized in wave form, adjusting the relative amplitude of said summation trace and of each of said reproduced traces to bring the amplitude of said interference wave in said summation trace and in each of said reproduced traces to substantially the same level, subtractively combining said summation trace with each of said plurality of reproduced traces, while said interference wave remains in substantial time coincidence, to produce a corresponding plurality of difference traces wherein said interference wave is substantially canceled due to said time coincidence, and displaying said plurality of difference traces for interpretation of data which may have been obscured by said interference wave.

3. The method of substantially eliminating a seismic interference wave on a plurality of phonographically reproducible seismic data traces representing seismic waves reflected from a plurality of horizontally spaced subsurface reflection points and received at a corresponding plurality of reception points spaced from each other and from the point of initiation of said waves, said method comprising the steps of ascertaining the time pattern of occurrence of said interference wave on said plurality of traces, time-shifting some of said traces relative to others to bring said interference wave into substantial time coincidence on all of said traces, simultaneously reproducing said time-shifted traces, additively combining said reproduced traces into a summation trace on which said interference wave is of maximum amplitude and of optimum wave form due to said time coincidence, adjusting the amplitudes of said interference wave in said summation trace and in each of said plurality of reproduced traces to be substantially equal, subtractively combining said summation trace and each of said plurality of reproduced traces while said interference wave remains in substantial time coincidence therein to produce a corresponding plurality of difference traces in which said interference wave is substantially canceled, and displaying said difference traces for interpretation of seismic data therein which may have been obscured by said interference wave.

4. The method of separating a first and a second seismic event with overlapping arrival times but different moveouts on a plurality of phonographically reproducible seismic data traces representing seismic waves reflected from a plurality of horizontally spaced subsurface reflection points to a corresponding plurality of reception points spaced from each other and from the point of initiation of said events, which method comprises the steps of simultaneously reproducing said data traces with differential time delays such as to bring said first event into substantial time coincidence on said traces, additively combining said reproduced traces into a first summation trace on which said first event is maximized in amplitude by said coincidence, relatively adjusting the amplitudes of said first summation trace and of each of said reproduced traces to bring the amplitude of said first event to a common level therein, subtractively combining said first summation trace and each of said reproduced traces with said first event in time coincidence therein to produce a corresponding plurality of first difference traces wherein said first even is approximately canceled, recording said first difference traces in phonographically reproducible form, and displaying said first difference traces visually for interpretation of said second event.

5. The method of claim 4 including the further steps of phonographically reproducing said first difference traces with differential time delays to bring said second event into substantial time coincidence therein, additively combining said reproduced first difference traces into a second summation trace in which said second event is maximized in amplitude and optimized in wave form, relatively adjusting the amplitudes of said second summation trace and of each of said reproduced traces to bring said second event to substantially the same amplitude level therein, subtractively combining said second summation trace and each of said reproduced traces while said second event remains in substantial time coincidence therein to produce a corresponding plurality of second difference traces in which said second event is substantially canceled, reproducing said second difference traces with differential time delays to bring said first event into substantial time coincidence therein, additively combining said reproduced second difference traces into a third summation trace in which said one event is maximized in amplitude due to said coincidence and further optimized in wave form due to the substantial absence of said second event in said second difference traces, adjusting the amplitudes of said first event in said third summation trace and in said reproduced traces to be substantially equal, and subtractively combining said third summation trace and each of said reproduced traces with said first event in substantial time coincidence therein to produce a corresponding plurality of third difference traces in which said first event is substantially canceled without affecting said second event, and displaying said third difference traces for interpretation of said second event.

6. The method of substantially eliminating a seismic interference wave from one of a plurality of phonographically reproducible seismic data traces representing seismic waves reflected from a plurality of horizontally spaced subsurface reflection points and received at a corresponding plurality of reception points spaced from each other and from a point where seismic waves are initiated, which method comprises the steps of producing a record of said traces substantially corrected for relative static and normal moveout time differences between said traces, ascertaining from said corrected record the approximate moveout pattern of an interference wave to be removed, relatively time-shifting some of the traces of said corrected record relative to others to bring said interference wave into approximate time coincidence therein, additively combining said time-shifted traces into a first summation trace, repeatedly cross-correlating said first summation trace with each corrected trace during the time interval of said interference wave, while varying the relative time-phase of the corrected waves to obtain a cross-correlation maximum and thereby establish a precise relative delay time for each corrected trace, additively combining said corrected traces, each with a corresponding precise relative delay time to bring said interference wave into substantial time coincidence therein, into a second summation trace, wherein said interference wave is maximized in amplitude and optimized in wave form, adjusting the relative amplitudes of said interference wave to be substantiially equal in said second summation trace and in said one trace, and subtractively combining said one trace and said second summation trace with said interference wave in time coincidence therein, whereby said interference wave is substantially canceled in said one trace, and displaying said one trace for interpretation of data which may have been obscured by said interference wave.

7. The method of claim 6 including the step, prior to each of said additively combining steps, of weighting each of said plurality of traces approximately inversely in proportion to the distance of the corresponding reception point from the point corresponding to said one trace.

References Cited by the Examiner
UNITED STATES PATENTS

| | | | |
|---|---|---|---|
| 2,879,476 | 7/1959 | Widess | 340—15.5 |
| 2,956,261 | 10/1961 | Grossling | 340—15.5 |
| 3,016,970 | 1/1962 | Allyn et al. | 340—15.5 |
| 3,032,743 | 5/1962 | Greening | 340—15.5 |
| 3,063,034 | 11/1962 | Lee | 340—15.5 |

BENJAMIN A. BORCHELT, Primary Examiner.

CHESTER L. JUSTUS, Examiner.